ically prepared, or can be otherwise reconfigured without departing from the scope of the appended claims.

United States Patent [19]
Coe

[11] Patent Number: 4,588,086
[45] Date of Patent: May 13, 1986

[54] SUBSTRATE AND MEDIA CARRIER

[76] Inventor: Thomas U. Coe, 15217 Sobey Rd., Saratoga, Calif. 95070

[21] Appl. No.: 618,189

[22] Filed: Jun. 7, 1984

[51] Int. Cl.⁴ ............................................. B65D 85/57
[52] U.S. Cl. .................................. 206/444; 206/309; 206/334; 206/454; 206/508
[58] Field of Search ............... 150/55; 206/45.34, 309, 206/311–313, 328, 334, 444, 445, 454, 503, 508, 557, 558, 561, 562, 563, 564; 211/40; 220/306

[56]  References Cited
U.S. PATENT DOCUMENTS

| | | | |
|---|---|---|---|
| 2,919,021 | 12/1959 | Robinson et al. | 206/454 |
| 3,164,478 | 1/1965 | Bostrom | 206/45.34 |
| 3,229,810 | 1/1966 | Goller | 206/45.34 |
| 3,376,046 | 4/1968 | Kivett et al. | 206/508 |
| 3,426,935 | 2/1969 | Swett | 150/55 |
| 3,533,503 | 10/1970 | Wood | 206/45.34 |
| 3,850,296 | 11/1974 | Hirata et al. | 206/454 |
| 3,961,877 | 6/1976 | Johnson | 206/454 |
| 4,043,451 | 8/1977 | Johnson | 206/454 |
| 4,103,773 | 8/1978 | Haber | 206/45.34 |
| 4,160,504 | 7/1979 | Kudlich et al. | 206/454 |
| 4,232,789 | 11/1980 | Springer | 206/564 |
| 4,450,960 | 5/1984 | Johnson | 206/454 |

Primary Examiner—William Price
Assistant Examiner—Jimmy G. Foster
Attorney, Agent, or Firm—Limbach, Limbach & Sutton

[57] ABSTRACT

A carrier for substrate and media disk members is disclosed having a base member with upstanding side and end walls and a top surface having a media supporting recess projecting downwardly and including a plurality of continuous semi-circular V-shaped grooves each subtending an angle of less than 180 degrees. Locating means are provided along one side of the carrier for locating the carrier with respect to disk handling equipment. The carrier is provided with a transparent lid having side and end walls respectively telescopically enclosing side and end walls of the base member. The base member has elongate indentations for engaging the top surface of the lid member on which the base member is stacked, and the lid member is provided with elongate upwardly projecting support ridges which contact the underside of the base member stacked thereon. The base member includes a peripheral flange and can include openings in the disk supporting grooves, and the lid member side walls include indentations with base member top engaging surfaces.

22 Claims, 13 Drawing Figures

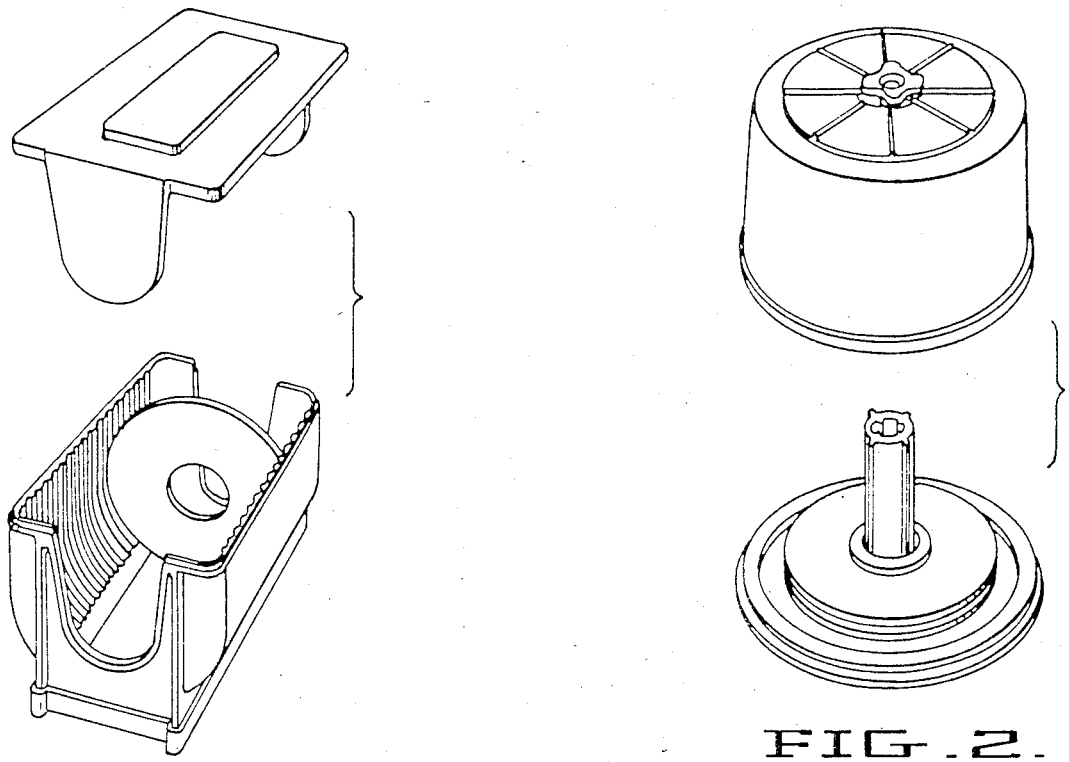
FIG. 1. PRIOR ART
FIG. 2. PRIOR ART
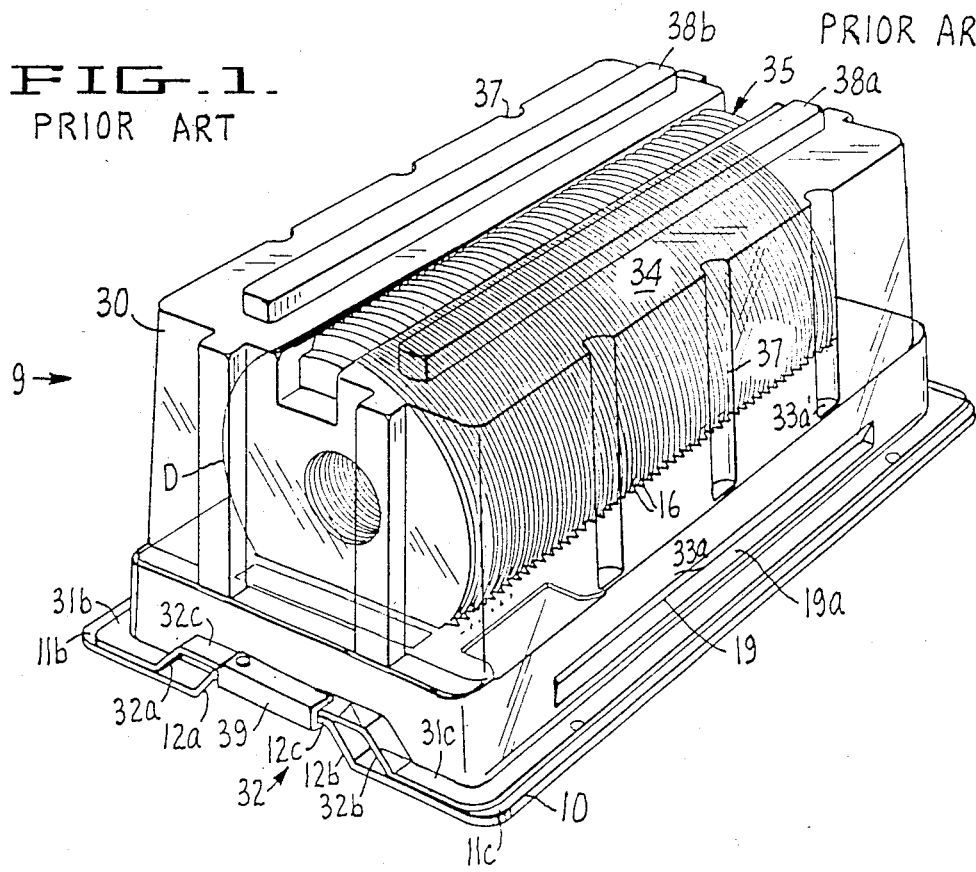
FIG. 3

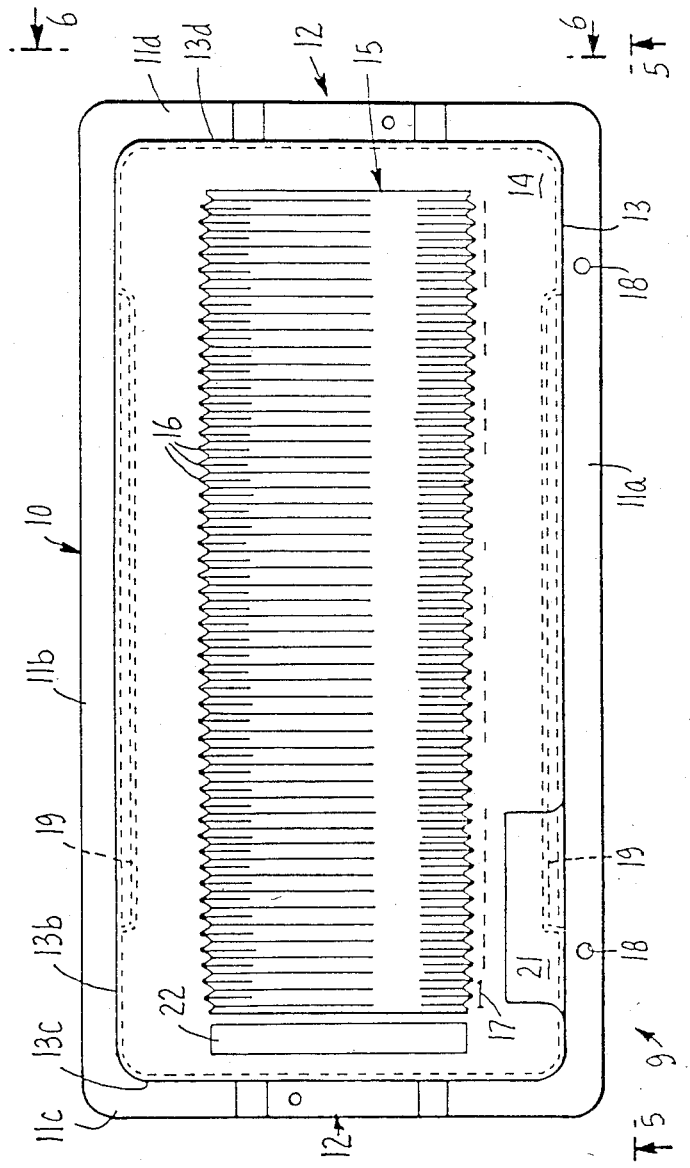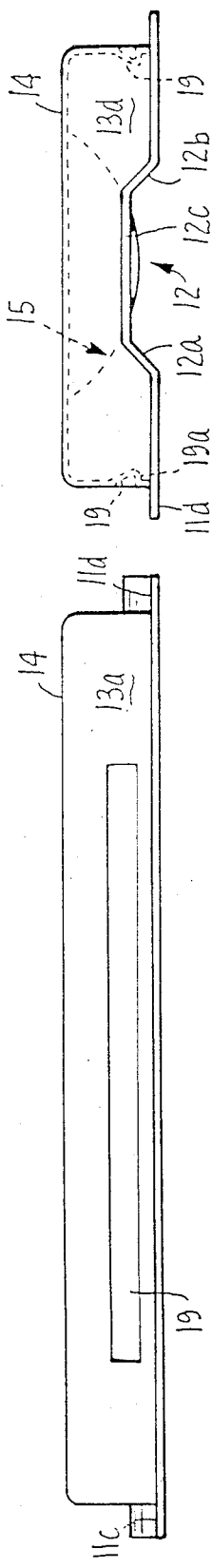

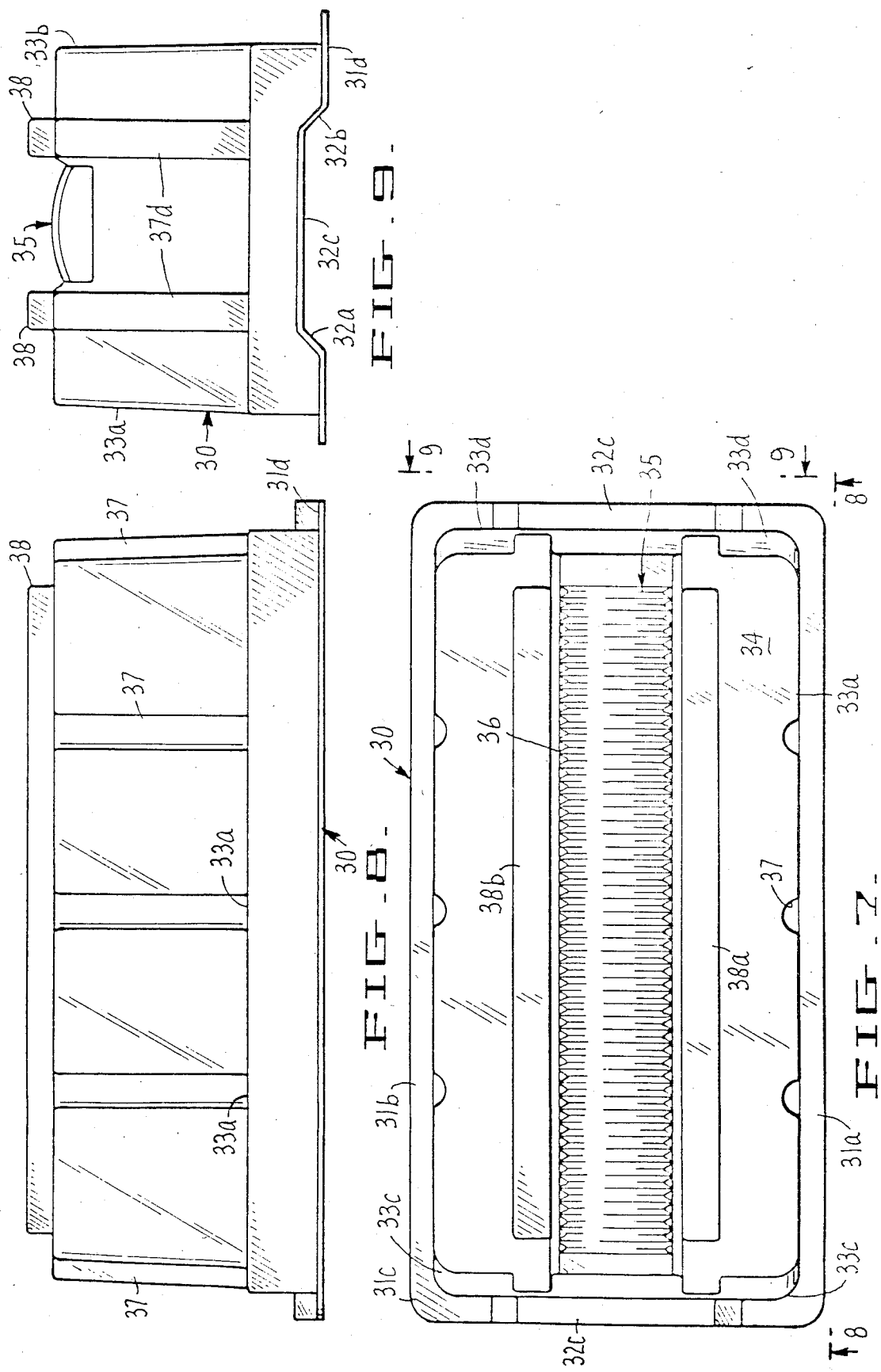

SUBSTRATE AND MEDIA CARRIER

DESCRIPTION

1. Technical Field

The present invention relates in general to substrate and media carriers and more specifically to carriers for disks and particularly annular, rigid, magnetic disks and their substrates.

2. Background Art

The exploding microcomputer market is increasing the demand tremendously for rigid disk drives and disk substrates for use in those drives. Currently 5¼ inch rigid disks are experiencing the most growth and other rigid disk sizes are being promoted. With the tremendous demand for rigid disks, automated production lines are needed to satisfy the volume of product required. These market conditions have created requirements for disk carriers and packaging that are amenable to stringent disk, media and disk drive specifications and their manufacturing environments. These requirements in turn dictate that disk carriers and packaging be compatible to human engineering principles in addition to being compatible to automation, clean room environments, high volume production, storage requirements and the rigors of common carrier transit.

The carriers currently available do not satisfy these requirements.

Certain of the currently available disk carriers are extensions of carriers originally designed for wafers used in the production of semiconductor chips. One such carrier is a container, as shown in FIG. 1, that is substantially U-shaped in transverse cross-section provided with a U-shaped opening in the opposite ends thereof, and extension of the U-shaped cross-section at the bottom of the "U" to an opening closed by a friction fit bottom cover. A lid is provided which closes the top of the carrier and the U-shaped openings in the opposite ends there. The opposing sidewalls of the container are provided with slots for receiving the opposite edges of a disk. Discs are dropped into the container in the opposing slots and come to rest in slot portions in the opposing side walls near the bottom of the U with the disk substantially entirely located below the top surface of the container. Discs can be removed from the container by removing the bottom and pushing the disks upwardly out of the container or by means of a mandrel inserted longitudinally through the central apertures in the disks for lifting upwardly to remove the disks. One of the drawbacks to this container is the ease with which a disk can be inserted in a crooked fashion in the container in non-matching slot portions in opposing side walls and the instability of the disk as it is lifted up out of the container, especially when the lateral most portions of the disk approach the top of the container. The manner in which disks are positioned within the container limits rigid holders for picking the disks out of the container to a grip on both the inside diameter and outside diameter of the disk, which prevents immediate placement of the disk on a spindle. When placing a disk on a spindle, typically the ID and OD grip must be transferred to a grip at two places on the OD.

Another currently available carrier, as shown in FIG. 2, is circular and provided with a central post onto which the disks are positioned at their central opening. Spacer rings are positioned between adjacent disks to separate the sensitive or coated surfaces thereof. These carriers suffer from a number of deficiencies different from the deficiencies of the "U-shaped" carriers. This spindle carrier does not permit ready access to any one particular disk in the stack without first removing at least all the disks from the stack above the disk of interest. Additionally, the spacer rings must be positioned on the disks and present the potential for rings sliding across and damaging the surface of the disk.

DISCLOSURE OF THE INVENTION

The object of the present invention is to provide a substrate and media carrier for disk and annular shaped members wherein all of the disks are individually accessible and can be fully enclosed for storage or rigid support in transit.

Another object of the present invention is to provide a substrate and media carrier easily and readily operable with automated production lines wherein disks in specific locations of the carrier can be readily accessible.

Another object of the present invention is to provide a disk carrier in which the disks can be handled by gripping on diametrically opposed outside diameter positions or, in the case of annular disks, at both an outside diameter and an inside diameter position.

Another object of the present invention is to provide disk carriers which can be stacked one on top of the other with the weight of the disks distributed down directly from the disks of one carrier to the disks in the carrier next below and thereupon to the disks of any carriers further below.

These objects are achieved in accordance with the present invention with a carrier having a base member with upstanding side and end walls and a top surface having a media supporting recess projecting downwardly and including a plurality of semicircular V-shaped grooves and locating means along one side of the carrier for locating the carrier and disk handling equipment.

One feature and advantage of the construction in accordance with the present invention is that a disk can only be inserted in one semicircular groove and the disk cannot be misaligned in the carrier.

Another feature and advantage of the present invention is that the carrier can be indexed and operated with automated machinery for fully automatically handling the disks held in the carrier individually, sequentially, or as a group.

In accordance with still another aspect of the present invention, the semicircular V-shaped grooves in the base member subtend an arc of substantially 45° whereby the disk can be grasped at diametrically opposed peripheral portions or, in the case of annular disks, can be grasped by contact at both the ID and the OD.

In accordance with still another aspect of the present invention, the carrier is provided with a transparent lid member having side and end walls respectively telescopically enclosing the side and end walls of the base member. With this construction the disks inside the carrier are clearly visible and can be sealed against environmental contamination. The telescoping side walls can be angled inwardly from the normal to the base of the members so that the side walls create a force-fit seal therebetween.

In accordance with still another aspect of the present invention, the carrier can be provided with elongated indentations in the base side walls which engage the lid top surface of the lid member on a pair of base and lid members onto which the particular carrier in question is stacked.

In accordance with still another aspect of the present invention, the lid of the carrier is provided with elongated upwardly projecting support ridges which contact the underside of the base member media supporting surface of a base member of a carrier positioned thereabove for distributing the weight of the disks in each carrier directly down on and through the disks in the carrier located therebelow.

In accordance with still another aspect of the present invention, the base member of the carrier can be provided with openings in the semicircular grooves thereof for draining liquid therefrom. With this construction the carrier can be used for wet process operation on the disks held by the carrier base member.

Another feature and advantage of the present invention is that with disks positioned in an apertured base member from which liquid has been drained, another base member of similar construction, but without openings, can be positioned on top of the disks and the assembly inverted. Then the apertured base member can be removed from the top of the assembly and replaced by the lid of the aforementioned construction for sealing the assembly of disks.

In accordance with another aspect of the present invention the carrier includes a flat peripheral base flange surrounding the bottom of both the base member and the lid member, providing stable support for the carrier. The peripheral flange can include raised peripheral portions at the ends of the carrier whereby the carrier can be easily grasped and lifted by its ends.

In accordance with still another aspect of the present invention, the carrier can be provided with means for locking the base and lid members together, preferably at the raised peripheral edge portion at the ends of the carrier.

These and other aspects, features and advantages of the present invention will become more apparent upon a perusal of the following description taken in conjunction with the accompanying drawings.

BRIEF DESCRIPTION OF THE DRAWINGS

FIG. 1 is a perspective view of one prior art carrier construction.

FIG. 2 is a perspective view of another prior art carrier construction.

FIG. 3 is a perspective view of the carrier in accordance with the present invention filled with disks.

FIG. 4 is a top plan view of the carrier base member utilized in the present invention.

FIG. 5 is a side elevational view of a portion of the structure shown in FIG. 4 taken along line 5—5 in the direction of the arrows.

FIG. 6 is an end elevational view of a portion of the structure shown in FIG. 4 taken along line 6—6 in the direction of the arrows.

FIG. 7 is a top plan view of the lid member of the carrier construction in accordance with the present invention.

FIG. 8 is a side elevational view of a portion of the structure shown in FIG. 7 taken along line 8—8 in the direction of the arrows.

FIG. 9 is an end elevational view of a portion of the structure shown in FIG. 7 taken along line 9—9 in the direction of the arrows.

BEST MODE FOR CARRYING OUT THE INVENTION

Figure 3A:
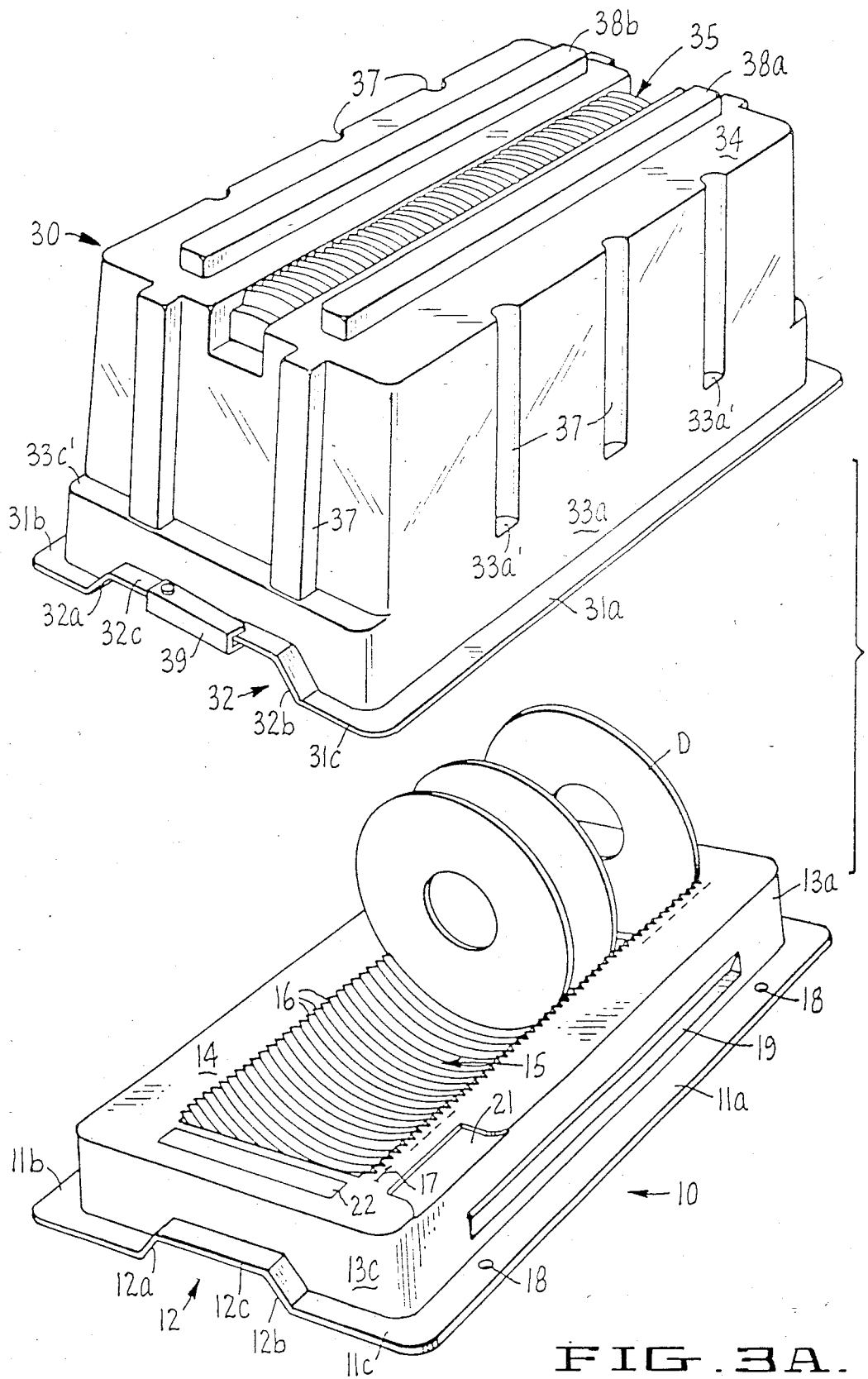
FIG. 3A is a perspective view of the structure shown in FIG. 3 with the lid removed from the base which includes only a few disks.
Figure 10:
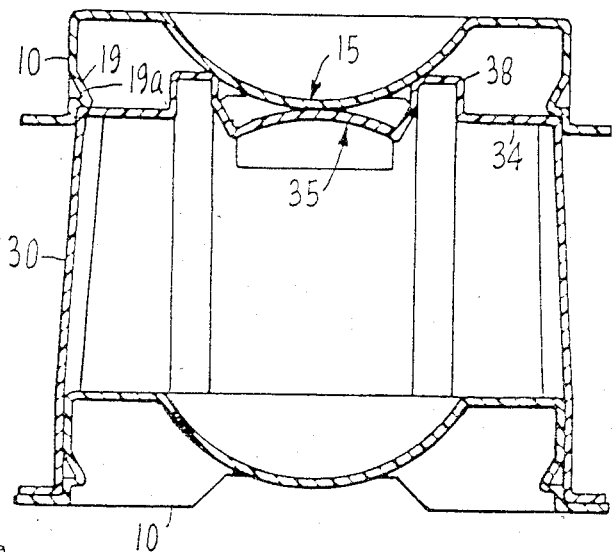
FIG. 10 is an elevational, sectional view of carriers of the present invention stacked one on top of another.
Figure 11:
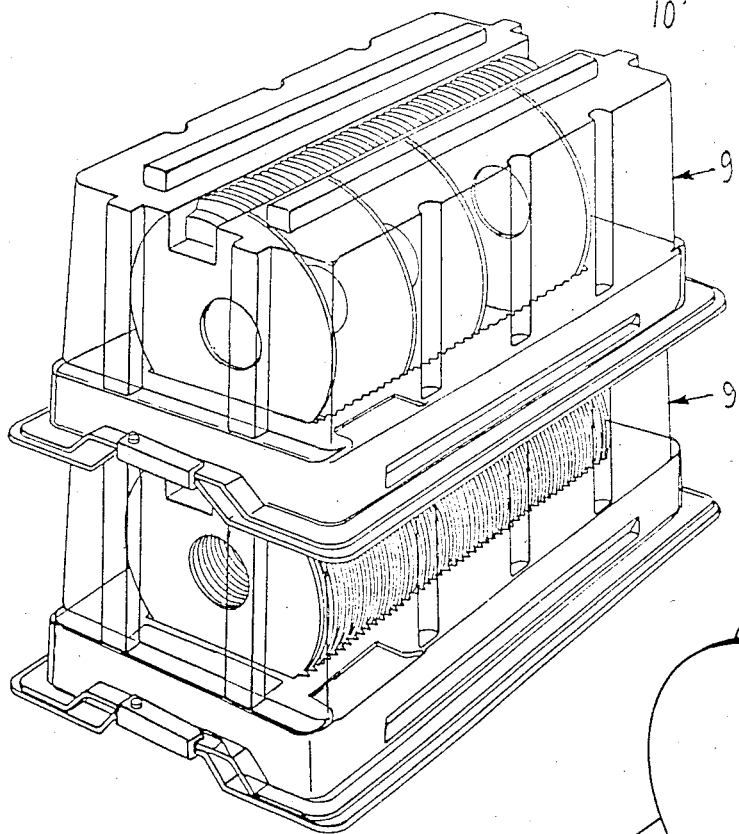
FIG. 11 is a perspective view similar to FIG. 10.

While the present invention is applicable to substrate disks, it is particularly applicable to annular, rigid, media disks for disk drives and therefore will be described with respect to the latter articles.

Referring now to FIGS. 3–10, the carrier 9 is formed of a base member 10 and a lid member 30. While the carrier parts can be made of various materials, in the preferred embodiment the base member 10 is made of white, high-impact polystyrene and the lid member 30 is made of clear polyethylene terephthalate glycol.

The base member 10 is generally rectangular in shape in plan view and is provided with a flat, horizontal, peripheral base flange 11 which includes flange portions 11a and 11b at the sides of the carrier and flange portions 11c and 11d at the ends of the carrier. The carrier has upstanding walls 13 connected to the base flange 11, the walls being angled slightly inwardly of the base member 10 from the normal to the base flange and including side walls 13a and 13b and end walls 13c and 13d, respectively, connected to the base flange portions 11a, b, c, and d. A top surface 14 is connected to the side and end walls 13 and includes a media supporting recess 15, semicylindrical in cross-sectional outline and including a plurality of V-shaped semicircular grooves for receiving an arcuate peripheral portion of the disk D. It has been found that semicircular grooves 16 subtending an arc of 45° provide good support for the disks D and permit ready access to more than 180° of the circumference of the disk for gripping by transfer devices, especially those that would grip the disk at diametrically opposing positions.

Figure 12:
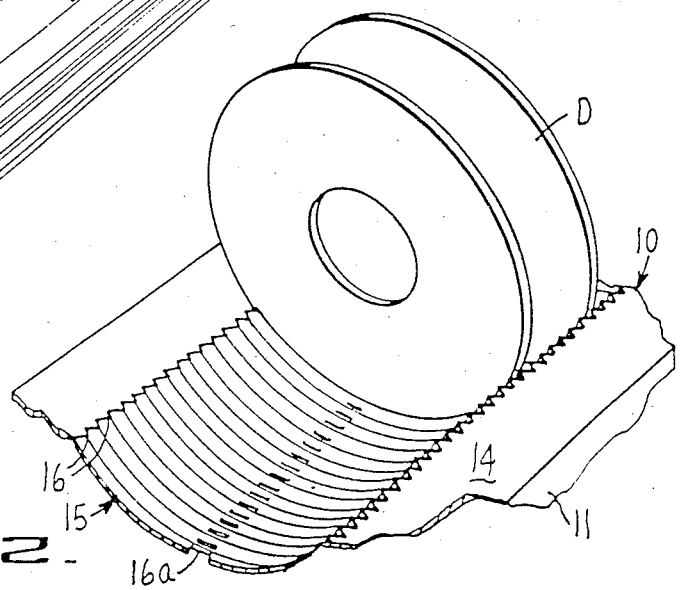
FIG. 12 is an enlarged perspective view of a portion of the base member of an alternative construction.

In accordance with one embodiment of the present invention as illustrated in FIG. 12, the grooves 6 of certain carriers can be provided with drain slots 16a at the lowest portion of the grooves 16 so that the carrier base member can be used with disks with which wet processes are employed during the manufacture so that liquid can drain from the disks in the base member through the slots 16a.

The top surface 14 includes identifying indicia 17 at each of the grooves 16 so that each of the disks placed in the carrier can be designated with a unique identifier.

A base member identifier locator is provided for indexing and locating the carrier with respect to automated handling equipment. While this identifier can take a number of different forms, one preferred form comprises a pair of pilot apertures 18 provided in only one base flange portion 11a. These apertures can be located by indexing pins in the automated machinery to properly locate the carrier. By providing pilot apertures 18 on only one side base flange portion, the carrier is assymetrical and, therefore, non-reversible, and all carriers will always be indexed from the same side of the carrier.

The base member 10 includes elongated indentations 19 along each of the side walls 13a and 13b with each indentation 19, including a flat bottom surface 19a adapted to engage the lid of a carrier combination 9 positioned below the particular carrier base member in question as described in greater detail below.

For additional identification, the base member 10 includes a label recess 21 on the top surface 14 toward one end of the carrier where a label identifying the nature of the disks being carried in the carrier can be positioned for human or machine readable identification. An identifying strip portion 22 is provided at one end of the base member of the carrier where the name of the carrier owner or carrier manufacturer can be printed or embossed.

Referring now to FIGS. 7–10, there is shown the detailed construction of the lid member 30 which has the same general rectangular plan configuration as the base member 10. The lid member 30 includes a peripheral base flange 31 provided with flange portions 31a and 31b on the sides and 31c and 31d at the ends corresponding to the base flange peripheral portions of the base member. The lid 30 is provided with walls 33, including side walls 33a and 33b and end walls 33c and 33d corresponding to and telescopically enclosing the side walls 11a and 11b and end walls 11c and 11d of the base member. The lid walls are angled inwardly at the same angle as the walls of the base member so that when the lid is placed on the base member, a friction fit seal is created between the base and lid members.

The lid member 30 is provided with a top surface 34 having a central recess 35 which is provided inside the lid member 30 with a plurality of semicircular grooves 36 aligned with the semicircular grooves 16 of the base member. The grooves 36 receive the top of a disk member positioned in the media supporting recess 15 of the base member, and the grooves 36 need subtend only a small arc, such as about 5°.

The lid member 30 includes structural elements for distributing the weight of stacked carriers to the carriers therebelow and including indentations 37 in the lid member having base top engaging surfaces at the bottom of the indentations engaging the top surface 14 of the base member. End indentations 37c and 37d in end walls 33c and 33d, respectively, include base top engaging surfaces 33c' and 33d'. Side wall indentations 37a and 37b in side walls 33a and 33b include base top engaging surfaces 33a' and 33b'.

The top surface 34 of the lid member 30 includes a pair of upwardly projecting elongated support bars or ridges 38a and 38b on opposite sides of the recess 35 for engaging the bottom of the media supporting recess 15 of a base member 10 supported on top of the lid member 30. With these ridges 38 the weight of disk members D in one carrier is distributed directly down onto the disk members immediately therebelow and directed from there to the base member 10 therebelow and any additional disks in a carrier below that base member 10.

The base member 10 and lid member 30 are provided with raised end peripheral portions 12 and 32, respectively. The raised peripheral portion 12 includes two angled peripheral portions 12a and 12b extending upwardly from the peripheral flange 11 to a horizontal raised peripheral portion 12c. Similarly, angled peripheral portions 32a and 32b extend upward to a horizontally raised peripheral portion 32c of the lid member. These raised peripheral portions provide a hand hole at the end of the container whereby the container can be picked up manually or by means of automated equipment.

Means are provided for locking the base lid members together. This locking means can take various forms including swinging clips 39 which are attached to raised peripheral flange portion 32c of the lid member 30 and swing to clamp the horizontal raised peripheral portions 12c and 32c together.

While it is believed that the preceding description of the preferred embodiment provides sufficient disclosure for use by a person skilled in the art, the following additional illustrative example is given.

A carrier in accordance with the present invention for holding 50 5¼ inch substrates or media is approximately 16 inches long, 8¾ inches wide with a base that is 1½ inches high and a lid which is approximately 6 inches high. The slots in the base are spaced ¼ inch apart center to center.

The carrier is suitable for both in processes handling of substrates and media and shipping and storage of final parts. The carrier is durable enough to be shipped by common carrier, air and surface transportation, providing protection of the substrates and media from external sources and preventing friction damage from part to part contact within the carrier. The carrier can be configured to accommodate any size media or substrate and is amenable to different methods of fabrication including vacuum and blow methods and injection molding.

These and other aspects, features and advantages of the present invention will become more apparent upon a perusal of the following description taken in conjunction with the accompanying drawings wherein similar characters of reference refer to similar parts in each of the several views.

I claim:

1. A carrier for substrate and media disk members comprising:
    a base member having
    a flat peripheral base flange,
    upstanding side and end walls connected to said base flange,
    a top surface having
        a semicylindrical disk supporting recess projecting downwardly toward said peripheral base flange and including a Plurality of continuous semicircular V-shaped grooves each subtending an arc of less than 180 degrees for holding a disk member, and
    locating means in said base peripheral flange along only one side wall for locating said carrier in disk handling equipment.

2. The carrier of claim 1 including a transparent lid member having side and end walls, respectively, telescopically enclosing said side and end walls of said base member.

3. The carrier of claim 2 wherein said lid member includes a top surface having a recessed portion centrally thereof including a plurality of semicircular V-shaped grooves inside said lid member for holding the top edge of disk members held by said base member.

4. The carrier of claim 2 wherein said side and end walls of said base and lid members are angled inwardly from the normal to said base and lid peripheral base flanges.

5. The carrier of claim 2 wherein said base and lid peripheral base flanges each have raised peripheral portions at the ends of said carrier and means for releasably securing said base and lid members together at said raised peripheral portions.

6. The carrier of claim 1 wherein said semicircular grooves in said base member recess subtend an arc of substantially 45°.

7. The carrier of claim 1 wherein said semicircular grooves in said base member recess have openings through said base member allowing drainage of liquid therethrough.

8. A carrier for substrate and media disk members comprising:
- a base member having
  - a flat peripheral base flange,
  - upstanding side and end walls connected to said base flange,
  - a top surface having a semicylindrical disk supporting recess projecting downwardly toward said peripheral base flange and including a plurality of semicircular V-shaped shaped grooves each for holding a disk member, and
- locating means in said base peripheral flange along only one side wall for locating said carrier in disk handling equipment and
- a transparent lid member having
  - side and end walls, respectively, telescopically enclosing said side and end walls of said base member,
  - a top surface having a recessed portion centrally thereof including a plurality of semicircular V-shaped grooves inside said lid member each groove for holding the top edge of a disk member held by said base member,
- said base member including elongated horizontal indentation on said side walls,
- said base member and lid member stackable in pairs one on top of another,
- said elongate indentations in said base side walls of one base member engaging said lid top surface of the lid member of the pair of base and lid members therebelow.

9. The carrier of claim 8 wherein said lid side walls include indentations with base top engaging surfaces for distributing the load of said lid member on said base member for allowing stacking carriers one on the top of another.

10. The carrier of claim 8 wherein said lid member includes elongated upwardly projecting support ridges which contact the underside of said base member media supporting surface of one base member positioned above said lid member when pairs of base and lid members are stacked on top of one another.

11. A substrate and media carrier comprising:
- a base member having
  - a flat horizontal peripheral base flange,
  - upstanding side and end walls connected to said peripheral base flange,
  - a top surface having a semicylindrical media supporting recess projecting downwardly toward said base flange and including a plurality of semicircular V-shaped grooves for holding disk members, and
  - elongated horizontal indentations in said side walls
- and a lid member having
  - a flat horizontal peripheral base flange to engage the base flange of said base member,
  - upstanding side and end walls connected to said lid base flange and respectively telescopically enclosing the base side and end walls, and
  - a top surface having a recessed portion centrally thereof including a plurality of semicircular V-shaped grooves inside said lid member for holding the top edge of disk members held by said base member,
- said base member and lid member stackable in pairs one on top of another,
- said elongated indentations in said base side walls of one base member engaging said lid top surface of the lid member of the pair of base and lid members therebelow.

12. The carrier of claim 11 wherein said lid member includes elongated upwardly projecting support ridges which contact the underside of said base member media supporting surface of one base member positioned above said lid member when pairs of base and lid members are stacked on top of one another.

13. The carrier of claim 11 wherein said semicircular grooves in said recess of the top surface of said base member subtend an arc of substantially 45°.

14. The carrier of claim 11 wherein said semicircular grooves in said top surface recess of said base member have openings through said base member allowing drainage of liquid therethrough.

15. The carrier of claim 11 wherein said lid member is transparent.

16. The carrier of claim 11 wherein said lid side walls include indentations with base top engaging surfaces for distributing the load of said lid member on said base member for allowing stacking carriers one on the top of another.

17. The carrier of claim 11 wherein said side and end walls of said base and lid members are angled inwardly from the normal to said base and lid peripheral base flanges.

18. The carrier of claim 11 wherein said base and lid peripheral base flanges each have raised peripheral portions at the ends of said carrier and clip means for releasably securing said base and lid members together at said raised peripheral portions.

19. The carrier of claim 11 wherein said base member includes locating means in said base peripheral flange along only one side wall of said base member for locating said carrier in disk handling machinery.

20. A substrate and media carrier comprising:
- a base member having
  - a flat horizontal peripheral base flange,
  - upstanding side and end walls connected to said peripheral base flange,
  - a top surface having a semicylindrical media supporting recess projecting downwardly toward said base flange and including a plurality of semicircular V-shaped grooves for holding disk members,
  - said semicircular grooves subtending an arc of substantially 45°,
  - elongated horizontal indentations in said side walls and
- locating means in said base peripheral flange along only one side wall of said base member for locating said carrier in disk handling equipment, and
- a transparent lid member having
  - a flat horizontal peripheral base flange to engage the base flange of said base member,
  - upstanding lid side and end walls connected to said lid base flange and respectively telescopically enclosing the base side and end walls, and
  - a top surface having a recessed portion centrally thereof including a plurality of semicircular V-shaped grooves inside said lid member for holding the top edge of disk members held by said base member, indentations in said lid walls with base top engaging surfaces for distributing the load of said lid member on said base member for allowing stacking carriers one on the top of another, said base member and lid member stackable in pairs one on top of another, said elongated indentations in said base side walls of one base member engaging said lid top surface of the lid member of the pair of base and lid members therebelow, said lid member including elongated upwardly projecting support ridges which contact the underside of said base member media supporting surface of one base member positioned above said lid member when pairs of base and lid members are stacked on top of one another, said side and end walls of said base and lid members being angled inwardly from the normal to said base and lid peripheral base flanges, said base and lid peripheral base flanges each having raised peripheral portions at the ends of said carrier, and clip means for releasably securing said base and lid members together at said raised peripheral portions.

21. A carrier for substrate and media disk members comprising:

a base member having
a flat peripheral base flange,
upstanding side and end walls connected to said base flange,
a top surface having a semicylindrical disk supporting recess projecting downwardly toward said peripheral base flange and including a plurality of continuous semicircular V-shaped grooves each subtending an arc of less than 180 degrees for holding a disk member; and a transparent lid member having side and end walls, respectively, telescopically enclosing said side and end walls of said base member, and a top surface,
said lid side walls including indentations each having a base top engaging surface for distributing the load of said lid member on said base member for allowing stacking carriers one on top of another.

22. A carrier for substrate and media disk members comprising:

a base member having
a flat peripheral base flange,
upstanding side and end walls connected to said base flange,
a top surface having a semicylindrical disk supporting recess projecting downwardly toward said peripheral base flange and including a plurality of continuous semicircular V-shaped grooves each subtending an arc of less than 180 degress for holding disk members, and a transparent lid member having
side and end walls, respectively, telescopically enclosing said side and and walls of said base member,
a top surface having a recessed portion centrally thereof including a plurality of semicircular V-shaped grooves inside said lid member, each groove for holding the top edge of a disk member held by said base member,
said lid member including elongated upwardly projecting support ridges which contact the underside of the base member disk supporting recess of one base member positioned above said lid member when pairs of base and lid members are stacked on top of one another.

* * * * *